United States Patent
Higashi et al.

(10) Patent No.: US 9,934,429 B2
(45) Date of Patent: Apr. 3, 2018

(54) STORAGE MEDIUM, RECOGNITION METHOD, AND RECOGNITION APPARATUS

(71) Applicant: FUJITSU LIMITED, Kawasaki-shi, Kanagawa (JP)

(72) Inventors: Hideto Higashi, Yokohama (JP); Yugo Matsuda, Machida (JP); Yasuhiro Tsuyuki, Numazu (JP); Masahiro Kataoka, Kamakura (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/083,736

(22) Filed: Mar. 29, 2016

(65) Prior Publication Data
US 2016/0292501 A1 Oct. 6, 2016

(30) Foreign Application Priority Data
Apr. 1, 2015 (JP) .................................. 2015-074990

(51) Int. Cl.
*G06K 9/22* (2006.01)
*G06K 9/00* (2006.01)
(Continued)

(52) U.S. Cl.
CPC ......... *G06K 9/00422* (2013.01); *G06K 9/222* (2013.01); *G06K 9/52* (2013.01);
(Continued)

(58) Field of Classification Search
USPC ....................................................... 382/187
See application file for complete search history.

(56) References Cited

U.S. PATENT DOCUMENTS

| 4,847,912 A | 7/1989 | Tanaka et al. |
| 5,600,735 A | 2/1997 | Seybold |

(Continued)

FOREIGN PATENT DOCUMENTS

| EP | 0428499 A2 | 5/1991 |
| JP | 06-266899 | 9/1994 |

(Continued)

OTHER PUBLICATIONS

Casey, Richard G. et al., "A Survey of Methods and Strategies in Character Segmentation", IEEE Transactions on Pattern Analysis and Machine Intelligence, vol. 18, No. 7, Jul. 1, 1996, pp. 690-706, XP055087686.

(Continued)

*Primary Examiner* — Jerome Grant, II
(74) *Attorney, Agent, or Firm* — Fujitsu Patent Center

(57) ABSTRACT

A non-transitory computer-readable storage medium stores a recognition program that causes a computer to execute a process. The process includes recognizing a plurality of characters from handwritten characters in input handwritten data; setting reference positions of a specific handwritten character and an adjacent handwritten character included in the handwritten characters based on recognition results of the recognized characters, the specific handwritten character and the adjacent handwritten character corresponding to a specific character and an adjacent character included in the recognized characters, respectively, the adjacent character being located adjacent to the specific character; determining whether a space is present between the specific character and the adjacent character based on the reference positions; and generating space information indicating a result of the determining.

9 Claims, 17 Drawing Sheets

(51) Int. Cl.
*G06K 9/52* (2006.01)
*G06K 9/62* (2006.01)
*G06T 7/60* (2017.01)
*G06T 7/73* (2017.01)

(52) U.S. Cl.
CPC .............. *G06K 9/6201* (2013.01); *G06T 7/60* (2013.01); *G06T 7/73* (2017.01); *G06K 2209/01* (2013.01)

(56) References Cited

U.S. PATENT DOCUMENTS

| | | | |
|---|---|---|---|
| 5,751,851 A | 5/1998 | Guzik et al. | |
| 7,203,903 B1* | 4/2007 | Thompson | G06F 3/04883 |
| | | | 382/187 |
| 2012/0308127 A1* | 12/2012 | Kudoh | G06K 9/4652 |
| | | | 382/165 |
| 2015/0293690 A1* | 10/2015 | Chang | G06F 17/242 |
| | | | 715/268 |
| 2016/0328620 A1* | 11/2016 | Elarian | G06K 9/00859 |
| 2017/0109578 A1* | 4/2017 | Bednarowicz | G06K 9/00476 |

FOREIGN PATENT DOCUMENTS

| | | |
|---|---|---|
| JP | 09-500473 | 1/1997 |
| WO | 95/30965 | 11/1995 |

OTHER PUBLICATIONS

Extended European Search Report dated Aug. 3, 2016 for corresponding European Patent Application No. 16161596.8, 4 pages.

\* cited by examiner

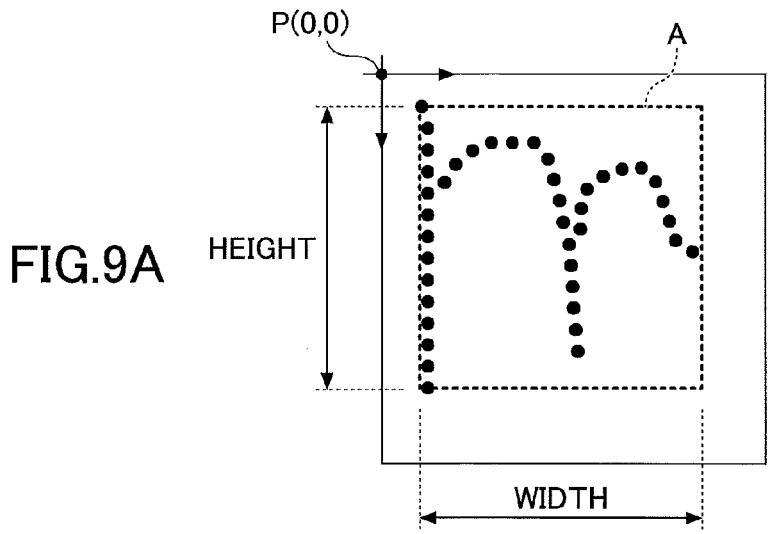

FIG.9A

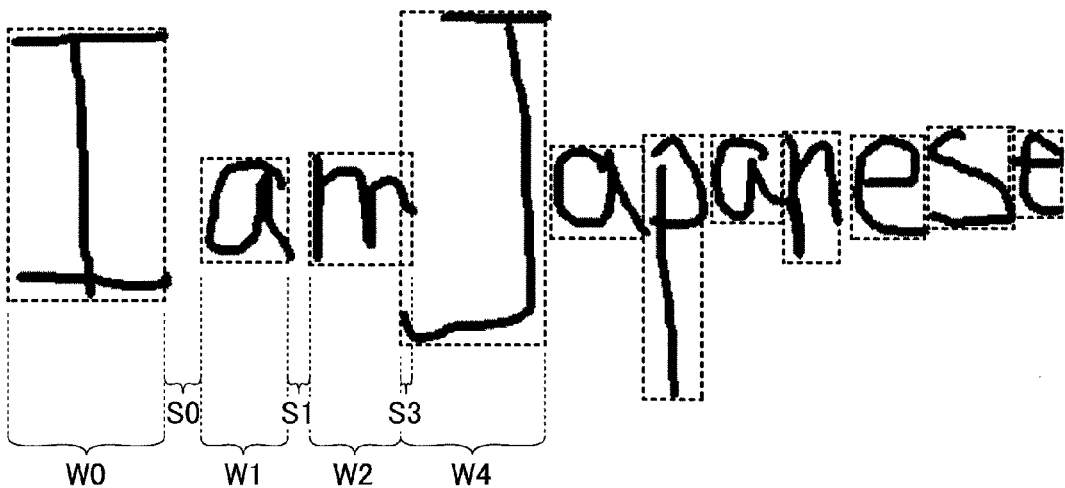

FIG.9B $$\alpha = \frac{1}{m}\sum_{i=0}^{m} S_i \quad \cdots \text{FORMULA (1)}$$

$$\beta = \frac{1}{n}\sum_{i=0}^{n} W_i \quad \cdots \text{FORMULA (2)}$$

$\alpha$ : AVERAGE INTER-CHARACTER GAP
$\beta$ : AVERAGE CHARACTER WIDTH
$W_i$ : CHARACTER WIDTH OF $i$-th CHARACTER
$S_i$ : INTER-CHARACTER GAP BETWEEN $i$-th CHARACTER AND $(i+1)$-th CHARACTER
$n$ : NUMBER OF CHARACTERS
$m$ : NUMBER OF INTER-CHARACTER GAPS $(=n-1)$ FIG.13A
FIG.13B
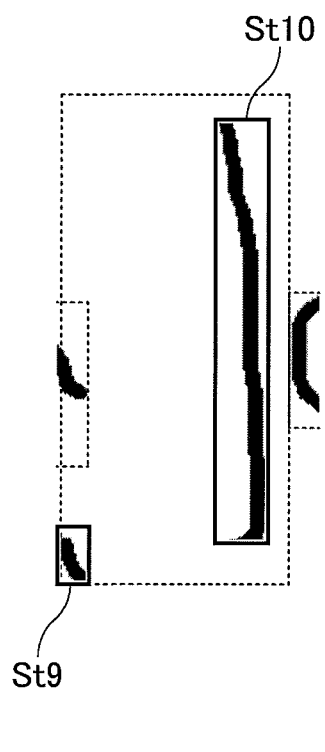
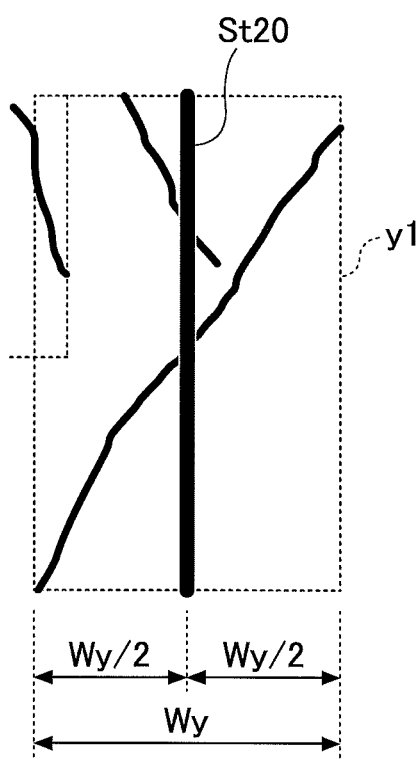

STORAGE MEDIUM, RECOGNITION METHOD, AND RECOGNITION APPARATUS

CROSS-REFERENCE TO RELATED APPLICATION

This application is based upon and claims the benefit of priority of Japanese Patent Application No. 2015-074990 filed on Apr. 1, 2015, the entire contents of which are incorporated herein by reference.

FIELD

An aspect of this disclosure relates to a storage medium, a recognition method, and a recognition apparatus.

BACKGROUND

There exists a technology for recognizing characters handwritten on a touch panel of, for example, a terminal, and recognizing words and sentences based on the recognized characters. In this technology, to recognize words and sentences, it is important to distinguish a border between characters from a "space" intentionally provided between characters (or words).

Japanese Laid-Open Patent Publication No. 09-500473 and Japanese Laid-Open Patent Publication No. 06-266899, for example, disclose a technology where a "space" between characters is identified based on a distance between character recognition frames of recognized characters.

SUMMARY

According to an aspect of this disclosure, there is provided a non-transitory computer-readable storage medium storing a recognition program that causes a computer to execute a process. The process includes recognizing a plurality of characters from handwritten characters in input handwritten data; setting reference positions of a specific handwritten character and an adjacent handwritten character included in the handwritten characters based on recognition results of the recognized characters, the specific handwritten character and the adjacent handwritten character corresponding to a specific character and an adjacent character included in the recognized characters, respectively, the adjacent character being located adjacent to the specific character; determining whether a space is present between the specific character and the adjacent character based on the reference positions; and generating space information indicating a result of the determining.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9A is a drawing illustrating a character recognition frame;

FIG. 9B is a drawing used to describe character information;

FIG. 13A is a drawing illustrating a case where an unnecessary vertical stroke element exists;

FIG. 13B is a drawing illustrating a case where no vertical stroke element exists;

DESCRIPTION OF EMBODIMENTS

There is a type of character whose character recognition frame has a boundary that is away from a centroid of the character recognized by a writer. Also, a writer tends to space characters by placing the centroids of the characters away from each other rather than by placing the boundaries of the characters away from each other.

For these reasons, with the related-art technology described above, it is difficult to determine whether a space is present before or after a character whose character recognition frame has a boundary that is away from the centroid of the character.

An aspect of this disclosure makes it possible to provide a storage medium, a recognition method, and a recognition apparatus that can improve the accuracy in recognition of spaces between characters.

Embodiments of the present invention are described below with reference to the accompanying drawings. In a character recognition method according to an embodiment, when a character is identified as a specific character (e.g., J, L, or T) whose character recognition frame (a frame surrounding each character) has a boundary that is away from a centroid of the character recognized by a writer, reference positions are set for the specific character and an adjacent character and used to improve the accuracy in recognizing a space between those characters. In the present application, a "space" indicates a blank intentionally placed by a writer between characters, words, or sentences to separate them from each other and is distinguished from an interval between characters in each word.

Figure 1A:
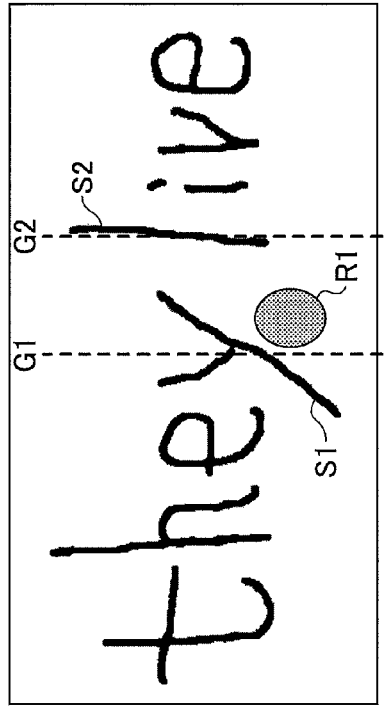
FIGS. 1A through 1D are drawings used to describe a method of identifying a space between characters.
Figure 1B:
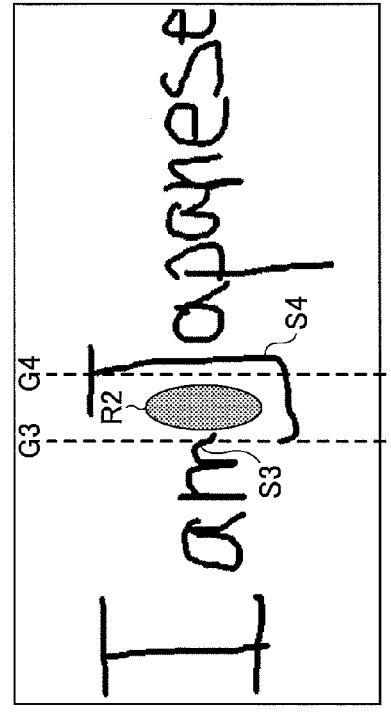
Figure 1C:
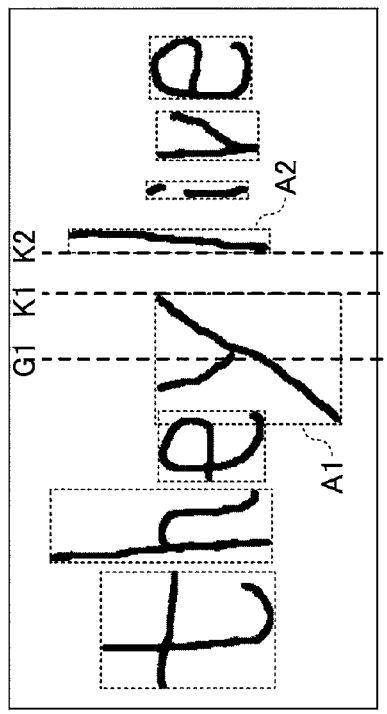
Figure 1D:
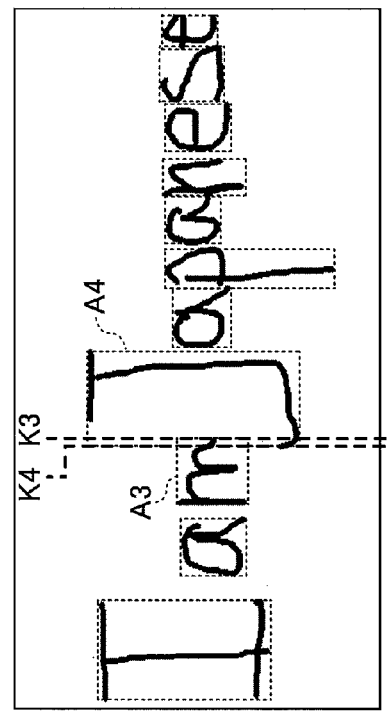

FIGS. 1A through 1D are drawings used to describe a method of identifying a space between characters. FIGS. 1A and 1B illustrate an example where recognized characters include a specific character "y", and FIGS. 1C and 1D illustrate an example where recognized characters include a specific character "J".

In FIGS. 1A and 1B, it is assumed that a character string "they live" is input by handwriting. In this case, the character string includes words "they" and "live", and it is desirable that a space is recognized between characters "y" and "L".

Here, as illustrated in FIG. 1A, a space-side boundary K1 (which is adjacent to a space) of a character recognition frame A1 of the character "y" is away from a central axis G1 of the character "y" recognized by a writer. Here, the central axis G1 is a vertical axis (Y axis in an XY coordinate system) that passes through the centroid of the character "y".

A writer tends to insert a space between the character "y" (specific character) and a character "1" by placing the central axis G1 of the character "y" at a distance L1 from a space-side boundary K2 of a character recognition frame A2 of the character "1".

In this case, when the presence of a space is determined based on a distance between character recognition frames, a distance L2 between the space-side boundary K1 of the character recognition frame A1 of the character "y" and the space-side boundary K2 of the character recognition frame A2 of the character "1" tends to become insufficient to determine that a space is present.

For the above reasons, in the present embodiment, whether a character is a specific character is determined before determining the presence of a space between the character and an adjacent character.

When it is determined that the character is a specific character, reference positions are set for the specific character and the adjacent character, and whether a space is present is determined based on the distance between the reference positions.

In the example of FIG. 1B, the central axis G1 is set as the reference position of the character "y", and an axis G2 indicating a position of a vertical component (or a vertical stroke) of the character "1" is set as the reference position of the character "1". That is, in the example of FIG. 1B, whether a space is present between the character "y" and the character "1" is determined based on a distance L1 between the central axis G1 and the axis G2.

In the present embodiment, a specific character indicates a character that, together with an adjacent character, forms a large "inner area" surrounded by strokes of the specific character and the adjacent character. Also in the present embodiment, specific characters are determined in advance and stored in a database.

In FIG. 1B, an inner area R1 is formed by a stroke S1 of the character "y" and a stroke S2 of the character "1". In the present embodiment, the presence of a space is determined based on the distance L1 including the width of the inner area R1.

In FIGS. 1C and 1D, it is assumed that a character string "I am Japanese" is input by handwriting. In this case, it is desirable that a space is recognized between words "I" and "am", i.e., between characters "I" and "a".

Also, it is desirable that a space is recognized between words "am" and "Japanese", i.e., between characters "m" and "J". Here, recognition of the space between the characters "m" and "J" is described as an example.

The character "J" is a predetermined specific character, and a distance L3 between a space-side boundary K3 of a character recognition frame A3 of the character "m" and a space-side boundary K4 of a character recognition frame A4 of the character "J" is insufficient to determine that a space is present.

Therefore, in the present embodiment, reference positions are set for the characters "m" and "J" as illustrated in FIG. 1D. In this example, G3 is set as the reference position of the character "m", and G4 is set as the reference position of the character "J".

The reference position G3 corresponds to one of vertical strokes of the character "m" that is closest to the space, and the reference position G4 corresponds to a vertical stroke of the character "J". In the present embodiment, the presence of a space between the characters "m" and "J" is determined based on a distance L4 between the reference positions G3 and G4.

Also in FIG. 1D, an inner area R2 is formed by a stroke S3 of the character "m" and a stroke S4 of the character "J". Thus, the presence of a space is determined based on the distance L4 including the width of the inner area R2.

As described above, in the present embodiment, the presence of a space between two characters is determined taking into account an inner area formed by strokes of the characters.

Thus, the present embodiment makes it possible to improve the accuracy in recognizing a space between adjacent characters.

First Embodiment

Figure 2:
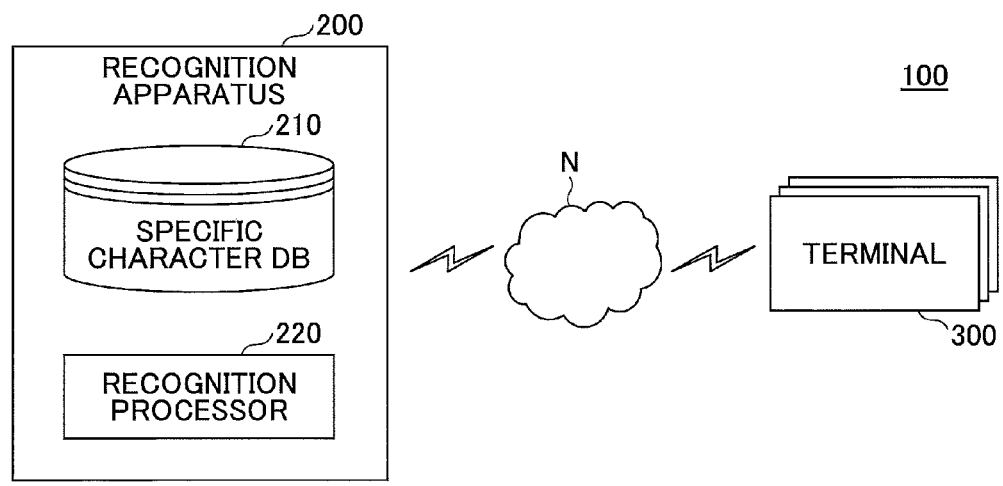
FIG. 2 is a drawing illustrating an exemplary configuration of a recognition system according to a first embodiment.

FIG. 2 is a drawing illustrating an exemplary configuration of a recognition system 100 according to a first embodiment. The recognition system 100 may include a recognition apparatus 200 and a terminal(s) 300. In the present embodiment, the recognition apparatus 200 and the terminal 300 are connected to each other via a network N.

The recognition apparatus 200 may include a specific character database 210 and a recognition processor 220.

In the recognition system 100, the terminal 300 receives an input of handwritten data, and sends the handwritten data to the recognition apparatus 200. When receiving the handwritten data from the terminal 300, the recognition processor 220 of the recognition apparatus 200 recognizes the handwritten data by referring to the specific character database 210 and outputs the recognition result to the terminal 300. The terminal 300 displays the recognition result received from the recognition apparatus 200.

The terminal 300 may include a display processor that displays an input screen for receiving an input of handwritten data and a result display screen for displaying a recognition result of the handwritten data. In the present embodiment, handwritten data is data that the terminal 300 requests the recognition apparatus 200 to recognize and represents strokes drawn by, for example, a human finger or a pointer. Examples of handwritten data include characters, numerals, and character strings. Handwritten data may also include figures and symbols.

Figure 3:
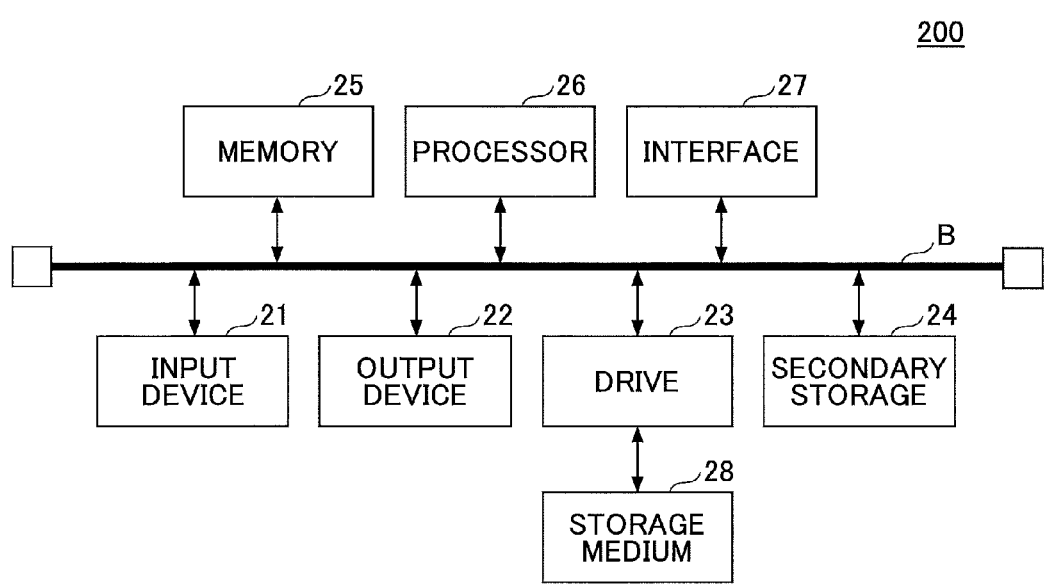
FIG. 3 is a block diagram illustrating an exemplary hardware configuration of a recognition apparatus of the first embodiment.

FIG. 3 is a block diagram illustrating an exemplary hardware configuration of the recognition apparatus 200 of the first embodiment.

The recognition apparatus 200 may include an input device 21, an output device 22, a drive 23, a secondary storage 24, a memory 25, a processor 26, and an interface 27 that are connected to each other via a bus B.

The input device 21 includes, for example, a keyboard and a mouse, and is used to input various types of information. The output device 22 is, for example, a display and used to display (or output) various signals. The interface 27 includes, for example, a modem and a LAN card, and is used to connect the recognition apparatus 200 to a network.

The recognition apparatus 200 may also include a recognition program that is one of programs for controlling the recognition apparatus 200. For example, the recognition program may be provided via a storage medium 28 or downloaded from a network. Examples of the storage medium 28 for storing the recognition program include storage media such as a compact disk read-only memory (CD-ROM), a flexible disk, and a magneto-optical disk that record information optically, electrically, or magnetically; and semiconductor memories such as a read-only memory (ROM) and a flash memory that record information electrically.

When the storage medium 28 storing the recognition program is mounted on the drive 23, the recognition program is read by the drive 23 from the storage medium 28 and installed in the secondary storage 24. On the other hand, when the recognition program is downloaded from a network, the recognition program is installed via the interface 27 in the secondary storage 24.

The secondary storage 24 stores the installed recognition program and other necessary files and data. The memory 25 stores the recognition program read from the secondary storage 24 when the recognition apparatus 200 (or a computer) is started. The processor 26 executes the recognition program stored in the memory 25 to perform various processes described later.

When the recognition apparatus 200 is, for example, a tablet computer or a smartphone, the recognition apparatus 200 may include a display-operation device that functions both as the input device 21 and the output device 22. The display-operation device may be implemented by, for example, a touch panel including a display function.

The terminal 300 may be implemented by, for example, a tablet computer or a smartphone including a touch panel for receiving an input of handwritten data.

Figures 4A, 4B:
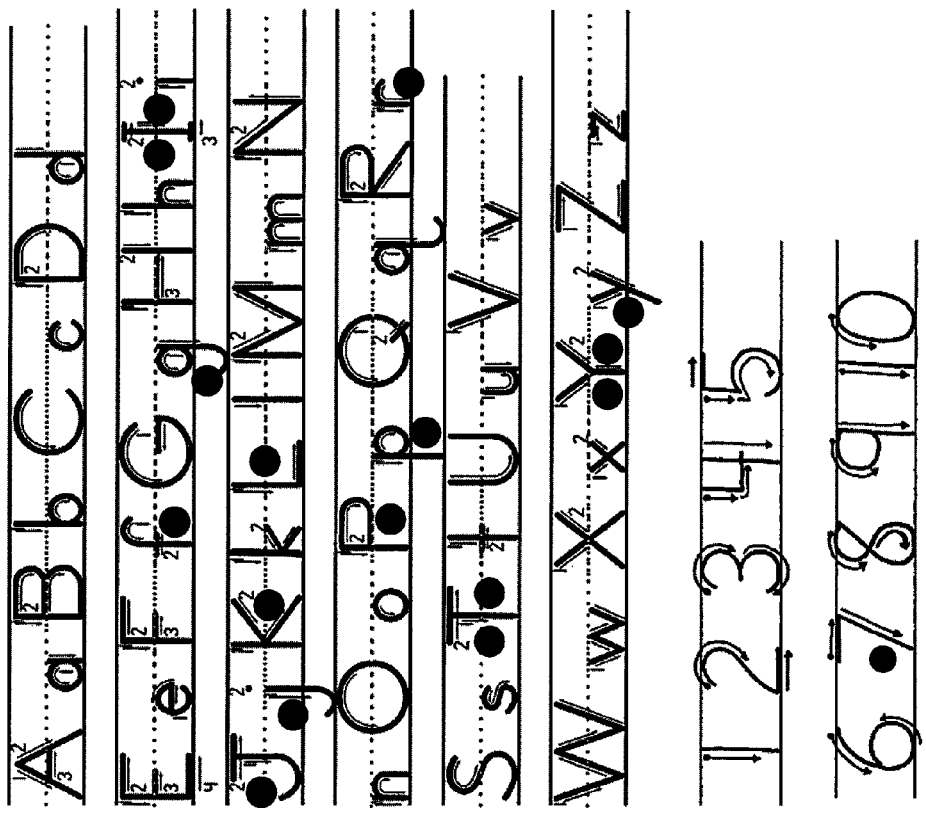
FIG. 4A is a drawing illustrating specific characters.
FIG. 4B is a drawing illustrating an exemplary specific character database of the first embodiment.

Next, the specific character database 210 of the present embodiment is described with reference to FIGS. 4A and 4B. FIG. 4A is a drawing illustrating specific characters, and FIG. 4B is a drawing illustrating an example of the specific character database 210 of the first embodiment.

In the present embodiment, a character that is likely to form a large inner area together with an adjacent character is referred to as a "specific character". In FIG. 4A, a filled circle is drawn next to each specific character and indicates an inner area to be formed between the specific character and an adjacent character. For example, specific characters are determined in advance based on past character recognition results of handwritten data by identifying characters for which spaces were not correctly recognized due to large inner areas formed between those characters and adjacent characters.

Examples of specific characters include "f", "g", "I", and "7". Specific characters of the present embodiment may also include characters other than letters and numerals. For example, specific characters may include characters used in various languages such as Hiragana and Hangul characters.

The specific character database 210 stores various specific characters as illustrated by FIG. 4B.

In the present embodiment, the presence of a space is determined only for each specific character. This approach makes is possible to prevent an error in determining the presence of a space that may occur when a small vertical element such as "b" or "d" is excluded.

Figure 5:
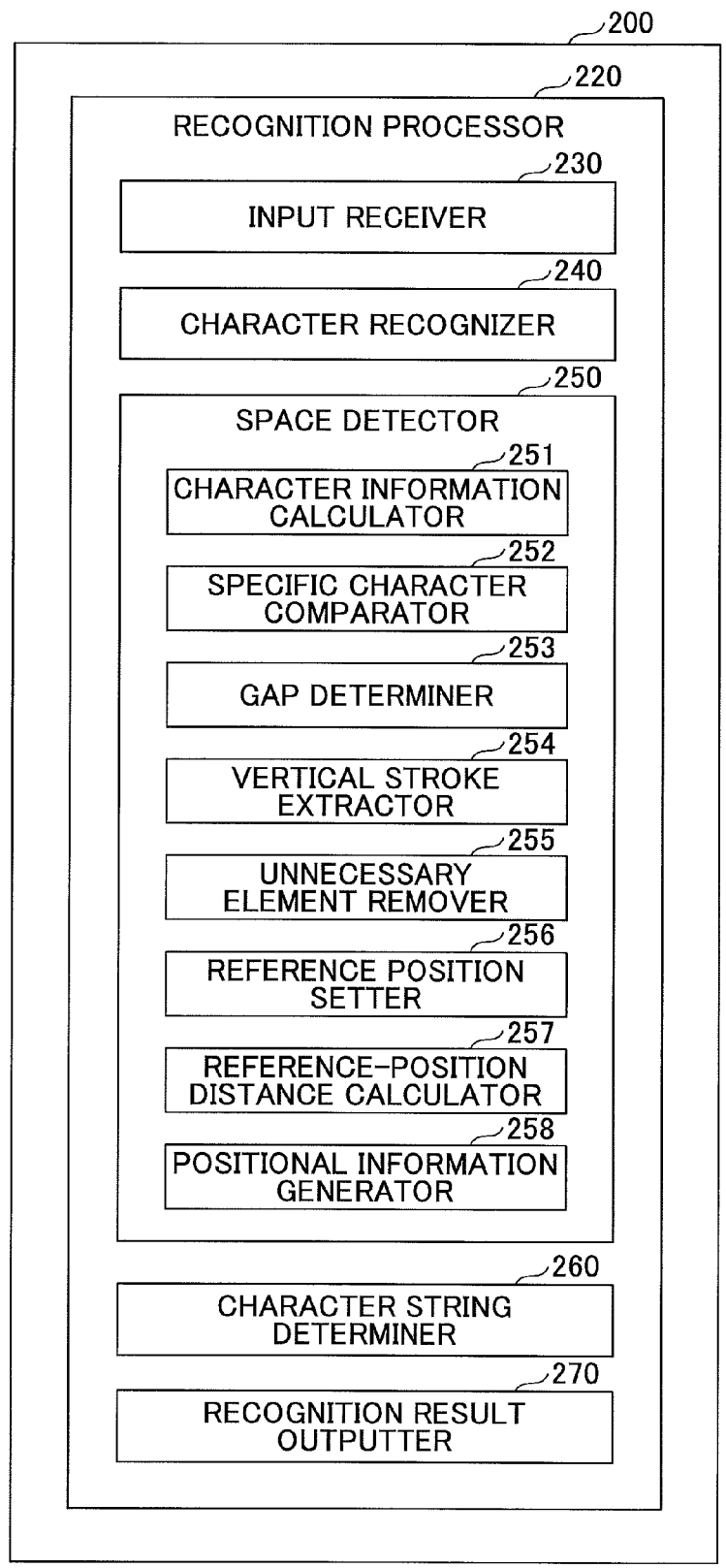
FIG. 5 is a drawing illustrating an exemplary functional configuration of a recognition apparatus of the first embodiment.

Next, a functional configuration of the recognition apparatus 200 is described with reference to FIG. 5. FIG. 5 is a drawing illustrating an exemplary functional configuration of the recognition apparatus 200 of the first embodiment.

The recognition apparatus 200 includes the recognition processor 220. The recognition processor 220 is implemented by executing the recognition program stored in the memory 25 by the processor 26.

The recognition processor 220 may include an input receiver 230, a character recognizer 240, a space detector 250, a character string determiner 260, and a recognition result outputter 270.

The input receiver 230 receives handwritten data sent from the terminal 300. The character recognizer 240 performs a character recognition process for recognizing characters in handwritten data.

The space detector 250 detects spaces between characters. Details of the space detector 250 are described later.

The character string determiner 260 determines a character string based on a character recognition result obtained by the character recognizer 240 and a space detection result obtained by the space detector 250. The recognition result outputter 270 outputs (or sends) a character string determined by the character string determiner 260 to the terminal 300 as a recognition result of the recognition apparatus 200.

The space detector 250 may include a character information calculator 251, a specific character comparator 252, a gap determiner 253, a vertical stroke extractor 254, an unnecessary element remover 255, a reference position setter 256, a reference-position distance calculator 257, and a positional information generator 258.

The character information calculator 251 calculates character information including heights and widths of recognized characters based on a character recognition result obtained by the character recognizer 240. In the present embodiment, the character information calculator 251 calculates character information including an average inter-character gap indicating an average of gaps between recognized characters and an average character width indicating an average of widths of the recognized characters. Here, gaps between characters include both intervals between characters within each word and "spaces" intentionally inserted between characters, words, and sentences, and are referred to as "inter-character gaps".

The specific character comparator 252 compares characters recognized by the character recognizer 240 with specific characters in the specific character database 210.

The gap determiner 253 determines whether a gap (inter-character gap) between characters recognized by the character recognizer 240 is greater than or equal to a distance that can be identified as a space.

The vertical stroke extractor 254 extracts vertical components of strokes constituting characters recognized by the character recognizer 240. Hereafter, a vertical component of strokes constituting a character is referred to as a "vertical stroke element".

The unnecessary element remover 255 removes vertical stroke elements unnecessary for detection of spaces from the vertical stroke elements extracted by the vertical stroke extractor 254 such that vertical stroke elements used for detection of spaces are left.

The reference position setter 256 obtains values indicating the positions of vertical stroke elements used for detection of spaces, and sets the obtained values as reference positions of the corresponding characters from which the vertical stroke elements have been extracted.

The reference-position distance calculator 257 calculates a distance between vertical stroke elements extracted from adjacent characters. In other words, the reference-position distance calculator 257 calculates a distance between reference positions of adjacent characters. The positional information generator 258 generates information indicating a position where a space is determined to be present.

Details of operations of the above components of the space detector 250 are described later.

Figure 6:
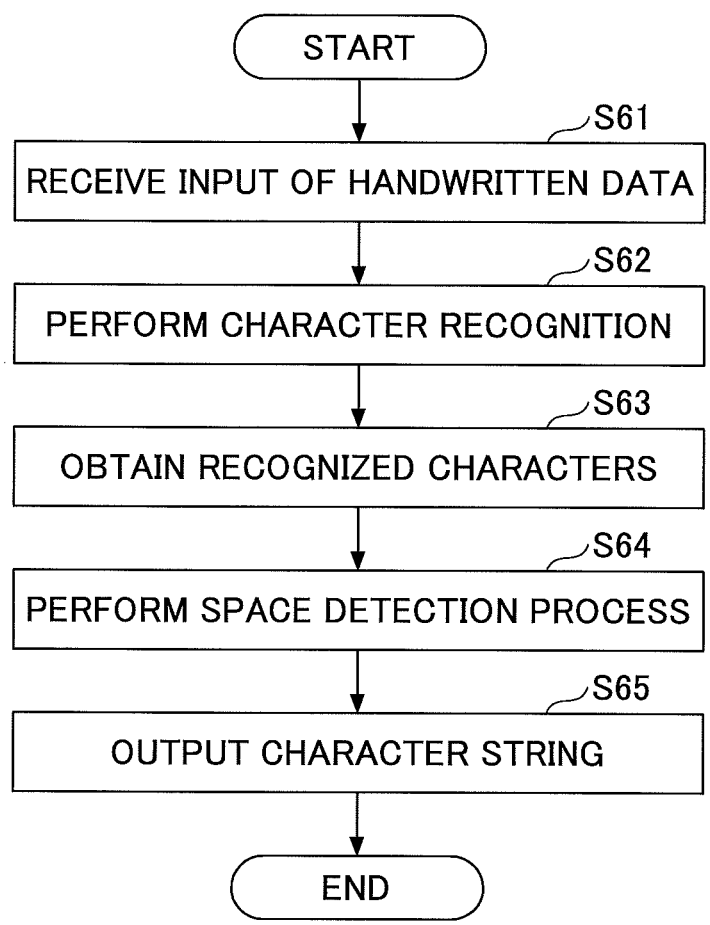
FIG. 6 is a flowchart illustrating an exemplary process performed by a recognition apparatus of the first embodiment.

Next, an exemplary process performed by the recognition apparatus 200 is described with reference to FIG. 6. FIG. 6 is a flowchart illustrating an exemplary process performed by the recognition apparatus 200 of the first embodiment.

In FIG. 6, the input receiver 230 of the recognition apparatus 200 receives handwritten data sent from the terminal 300 (step S61). Next, the character recognizer 240 performs character recognition on the handwritten data (step S62).

Next, the space detector 250 obtains characters recognized by the character recognizer 240 (step S63). The space detector 250 performs a space detection process for the obtained characters (step S64).

Then, the character string determiner 260 determines a character string based on the character recognition result of the character recognizer 240 and the space detection result of the space detector 250, and outputs the determined character string to the terminal 300 (step S65). The terminal 300 displays the character string received from the recognition apparatus 200.

Figure 7:
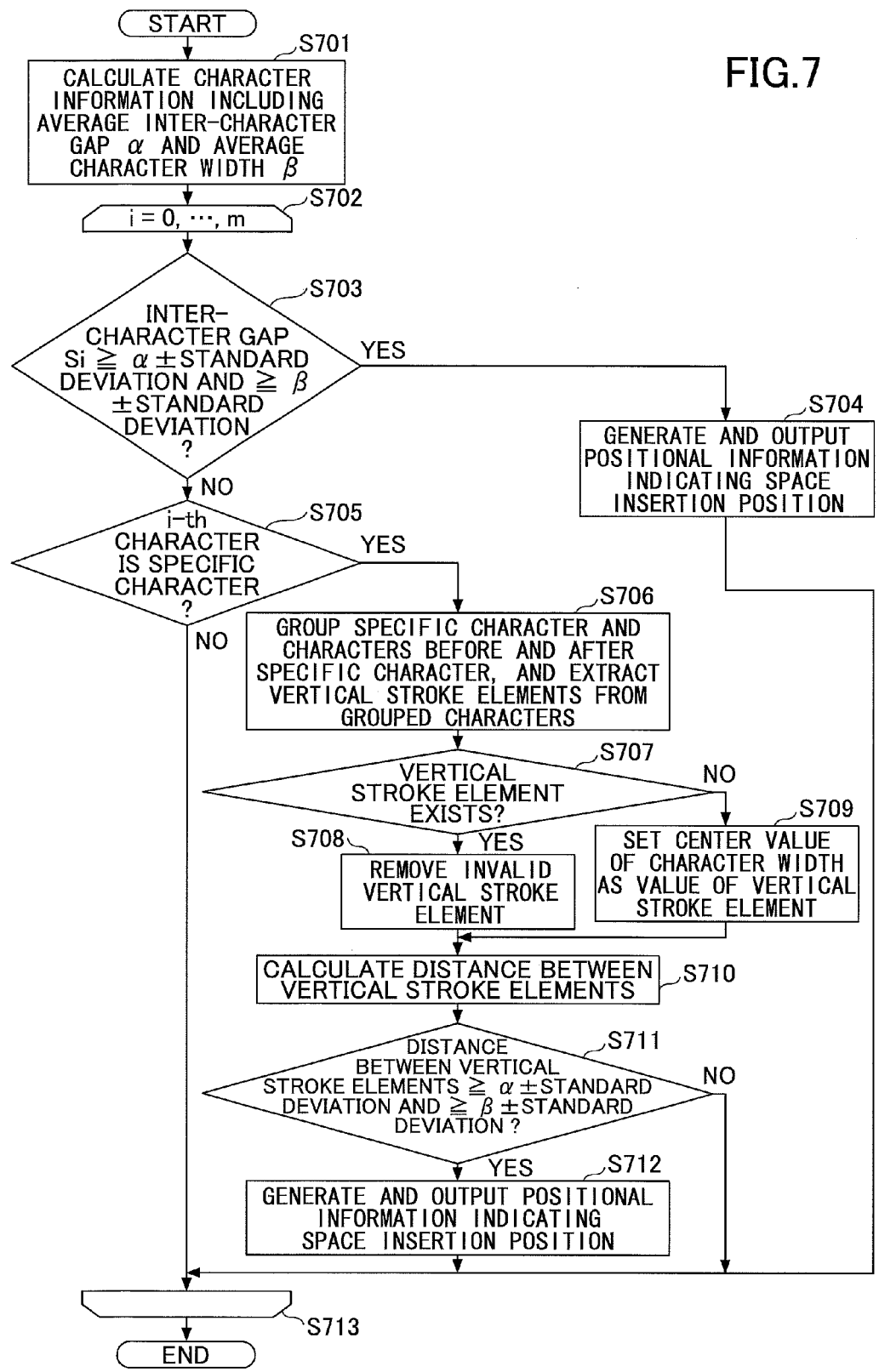
FIG. 7 is a flowchart illustrating an exemplary space detection process of the first embodiment.

Next, a space detection process performed by the space detector 250 is described with reference to FIG. 7. FIG. 7 is a flowchart illustrating an exemplary space detection process performed by the space detector 250 of the first embodiment.

The character information calculator 251 of the space detector 250 calculates character information including an average inter-character gap $\alpha$ and an average character width $\beta$ based on information indicating character recognition frames of recognized characters (step S701).

Then, the space detector 250 repeats step S703 and subsequent steps by changing a variable i (i=0–m) (step S702) indicating a position of a character in a recognized character string. Here, m indicates the number of inter-character gaps. When the number of recognized characters is n, m is represented by m=n–1.

The gap determiner 253 determines whether an inter-character gap Si is greater than or equal to the average inter-character gap $\alpha$±standard deviation and greater than or equal to the average character width $\beta$±standard deviation (step S703). The inter-character gap Si indicates a gap between an i-th character and an (i+1)-th character in the recognized character string.

When it is determined at step S703 that the inter-character gap Si satisfies the conditions (≥$\alpha$±STANDARD DEVIATION AND ≥$\beta$±STANDARD DEVIATION), the gap determiner 253 identifies the inter-character gap Si as a space. Then, the positional information generator 258 generates positional information indicating a space insertion position where a space is inserted, i.e., the position of the gap between the i-th character and the (i+1)-th character, and outputs the positional information to the character string determiner 260 (step S704). Thus, in the present embodiment, it is determined that a space is present between the i-th character and the (i+1)-th character when the inter-character gap Si between them is greater than or equal to the average inter-character gap $\alpha$ and greater than or equal to the average character width $\beta$.

When it is determined at step S703 that the inter-character gap Si does not satisfy the conditions (≥$\alpha$±STANDARD DEVIATION AND ≥$\beta$±STANDARD DEVIATION), the specific character comparator 252 determines whether the i-th character is a specific character by referring to the specific character database 210 (step S705). When it is determined at step S705 that the i-th character is not a specific character, the space detector 250 determines that no space is present between the i-th character and the (i+1)-th character, and proceeds to step S713 described later.

When it is determined at step S705 that the i-th character is a specific character, the vertical stroke extractor 254 forms the i-th character and characters before and after the i-th character into a group, and extracts vertical stroke elements from the respective characters in the group (step S706). That is, the vertical stroke extractor 254 extracts a vertical stroke element(s) from each of the (i−1)-th character, the i-th character, and the (i+1)th character.

Next, the vertical stroke extractor 254 determines for each character in the group whether the character includes one or more vertical stroke elements (step S707). When it is determined at step S707 that the character includes one or more vertical stroke elements, the unnecessary element remover 255 removes an invalid vertical stroke element(s) of the character (step S708).

When it is determined at step S707 that the character includes no vertical stroke element, the vertical stroke extractor 254 sets a value indicating the center of the width of the character as a value of a vertical stroke element (step S709).

When step S707 and step S708/S709 are performed for every one of the characters in the group, the reference position setter 256 obtains values indicating the positions of the vertical stroke elements of the respective characters, and sets the obtained values as reference positions of the characters. Then, the reference-position distance calculator 257 calculates a distance between the reference positions for each pair of adjacent characters in the group (step S710).

In the present embodiment, the reference-position distance calculator 257 calculates a distance between a vertical stroke element of the (i−1)-th character that is closest to the i-th character and a vertical stroke element of the i-th character that is closest to the (i−1)-th character. Similarly, the reference-position distance calculator 257 calculates a distance between a vertical stroke element of the i-th character that is closest to the (i+1)-th character and a vertical stroke element of the (i+1)-th character that is closest to the i-th character. Also in the present embodiment, the coordinate(s) of the center of the width of each vertical stroke element is used as a value of the vertical stroke element in calculating the distance between vertical stroke elements.

Next, the gap determiner 253 determines whether the distances between the vertical stroke elements of the pairs of adjacent characters are greater than or equal to the average inter-character gap $\alpha$±standard deviation and greater than or equal to the average character width $\beta$±standard deviation (step S711).

When it is determined at step S711 that none of the distances between the vertical stroke elements satisfy the conditions (≥α±standard deviation and ≥β±standard deviation), the space detector 250 proceeds to step S713.

When it is determined at step S711 that at least one of the distances between the vertical stroke elements satisfies the conditions (≥α±standard deviation and ≥β±standard deviation), the gap determiner 253 determines that the distance between the vertical stroke elements indicates a space. Then, the positional information generator 258 generates positional information indicating a space insertion position where a space is inserted, and outputs the positional information to the character string determiner 260 (step S712).

Here, the positional information indicates a space insertion position, i.e., indicates that a space is present between the characters. In the present embodiment, positional information indicating a space insertion position is generated when it is determined that a distance between vertical stroke elements indicates a space. However, the present invention is not limited to this embodiment. For example, information indicating a position where no space is present may be generated and output to the character string determiner 260 when it is determined that a distance between vertical stroke elements does not indicate a space.

The space detector 250 repeats steps S703 through S712 until the variable i reaches "m" (step S713), and then ends the process.

Next, the space detection process performed by the space detector 250 is described in more detail with reference to FIGS. 8 through 15.

Figure 8:
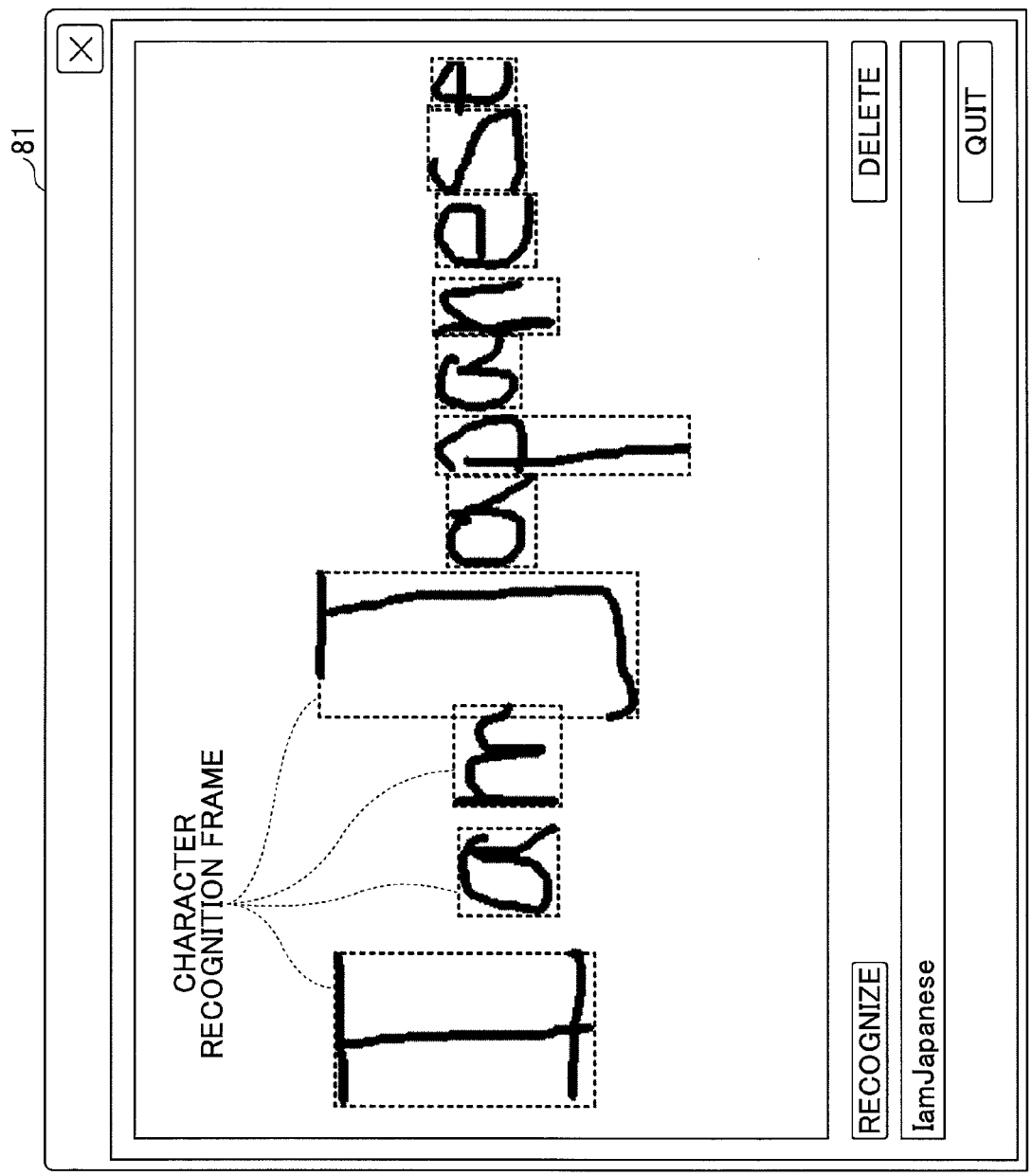
FIG. 8 is a drawing illustrating exemplary handwritten data.

FIG. 8 is a drawing illustrating exemplary handwritten data. In FIG. 8, a screen 81 is an example of an input screen used to input handwritten data and displayed on the terminal 300.

On the screen 81, a character string "I am Japanese" is input by handwriting. This character string is sent to the recognition apparatus 200 as handwritten data.

The character recognizer 240 of the recognition apparatus 200 performs character recognition to recognize characters in the handwritten data, and the character information calculator 251 obtains information indicating character recognition frames of the recognized characters. The information indicating character recognition frames includes heights and widths of characters.

FIG. 9A is a drawing illustrating a character recognition frame, and FIG. 9B is a drawing used to describe character information.

In the present embodiment, information (which is hereafter referred to as "character recognition frame information") indicating character recognition frames of characters is obtained when the characters in handwritten data are recognized by the character recognizer 240. In the descriptions below, it is assumed that character recognition frame information includes, for each character recognition frame, a value indicating the height of the character recognition frame and a value indicating the width of the character recognition frame. In the present embodiment, the height of the character recognition frame of a character is used as the height of the character, and the width of the character recognition frame of a character is used as the width of the character.

FIG. 9A illustrates a character recognition frame A surrounding a character "m". In FIG. 9A, the character "m" is represented by a collection of dots, and the character recognition frame A surrounds the collection of dots.

A value H indicating the height of the character recognition frame A and a value W indicating the width of the character recognition frame A constitute character recognition frame information of the character recognition frame A, and are used as the height and the width of the character "m".

The value H indicating the height of the character recognition frame A and the value W indicating the width of the character recognition frame A may be obtained based on the coordinates of four points of the character recognition frame A. The coordinates of four points of the character recognition frame A may be determined with reference to a reference point set in the input screen. In the example of FIG. 9A, the height H and the width W of the character recognition frame A are obtained with reference to a reference point P (0,0) at the upper-left corner of the input screen.

The character information calculator 251 obtains character recognition frame information of characters recognized by the character recognizer 240 as described above. Then, the character information calculator 251 calculates character information based on the obtained character recognition frame information as illustrated by FIG. 9B.

In the present embodiment, character information includes an average inter-character gap α and an average character width β of characters in a character string recognized in handwritten data.

When Wi indicates a character width of an i-th character in a recognized character string, Si indicates an inter-character gap between the i-th character and an (i+1)-th character, n indicates the number of characters in the character string, and m (=n−1) indicates the number of inter-character gaps, the average inter-character gap α and the average character width β are obtained by formulas (1) and (2), respectively, in FIG. 9B.

Thus, in the present embodiment, the character information calculator 251 calculates the average inter-character gap α and the average character width β by using the character recognition frame information and the formulas (1) and (2).

Figure 10:
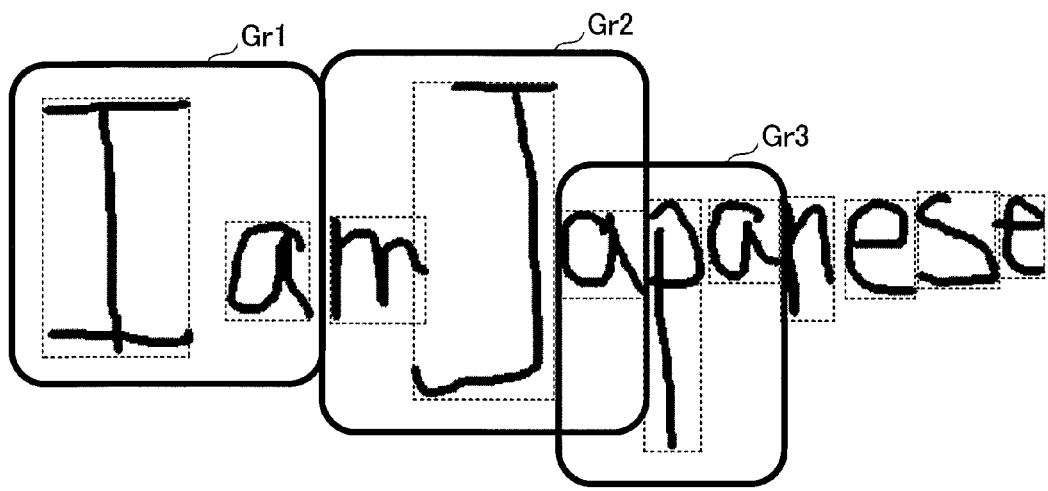
FIG. 10 is a drawing illustrating recognized characters including specific characters.

FIG. 10 is a drawing illustrating recognized characters including specific characters. In the example of FIG. 10, among the recognized characters, "I", "J", and "p" are included in the specific character database 210.

Accordingly, reference positions are set for the characters "I", "J", and "p" and characters adjacent to the characters "I", "J", and "p", and the presence of spaces is determined based on the reference positions.

A character "a" is adjacent to the character "I", and these characters are formed into a group Gr1. Reference positions are set for the characters "I" and "a" in the group Gr1, and whether a space is present between the characters "I" and "a" is determined based on the reference positions. The reference positions are set based on vertical stroke elements extracted from the characters "I" and "a" in the group Gr1.

Here, because the character "I" is at the beginning of the character string, no character exists before the character "I". Therefore, for the character "I", only the presence of a space between the character "I" and the following character "a" is determined.

A character "m" and a character "a" are adjacent to the character "J", and these characters are formed into a group Gr2. Reference positions are set for the characters "J", "m", and "a" in the group Gr2, and whether spaces are present between the character "J" and the characters "m" and "a" is determined based on the reference positions. The reference positions are set based on vertical stroke elements extracted from the characters "J", "m", and "a" in the group Gr2.

Similarly, a character "a" and a character "a" are adjacent to the character "p", and these characters are formed into a group Gr3. Reference positions are set for the characters "p", "a", and "a" in the group Gr3, and whether spaces are present between the character "p" and the characters "a" and "a" before and after the character "p" is determined based on the reference positions. The reference positions are set based on vertical stroke elements extracted from the characters "p", "a", and "a" in the group Gr3.

Figure 11:
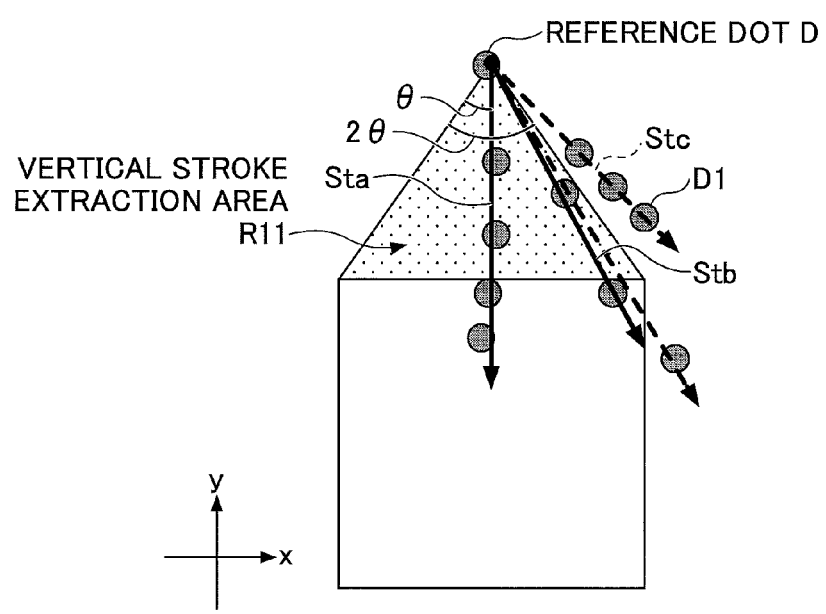
FIG. 11 is a drawing illustrating a method of extracting vertical stroke elements.

FIG. 11 is a drawing illustrating a method of extracting vertical stroke elements. In the present embodiment, when a specific character and a character(s) adjacent to the specific character are identified, the vertical stroke extractor 254 extracts a vertical stroke element(s) from each of the characters.

The vertical stroke extractor 254 sets a reference dot D for each character, and identifies strokes represented by dots in a range (vertical stroke extraction area R11) of ±θ degrees from a vertical axis passing through the reference dot D as vertical stroke elements. Here, the vertical axis passing through the reference dot D extends in the Y-axis direction in an XY coordinate system in FIG. 11.

Thus, in the present embodiment, strokes within a predetermined angle from the reference dot D are identified as vertical stroke elements. This method makes it possible to extract even a stroke written by a shaky hand as a vertical stroke element.

In the example of FIG. 11, a stroke Sta and a stroke Stb are represented by dots in the range of ±θ degrees from the vertical axis passing through the reference dot D, and are therefore extracted as vertical stroke elements.

On the other hand, a stroke Stc is represented by dots outside of the range of ±θ degrees from the vertical axis passing through the reference dot D, and is therefore not extracted as a vertical stroke element.

Figure 12:
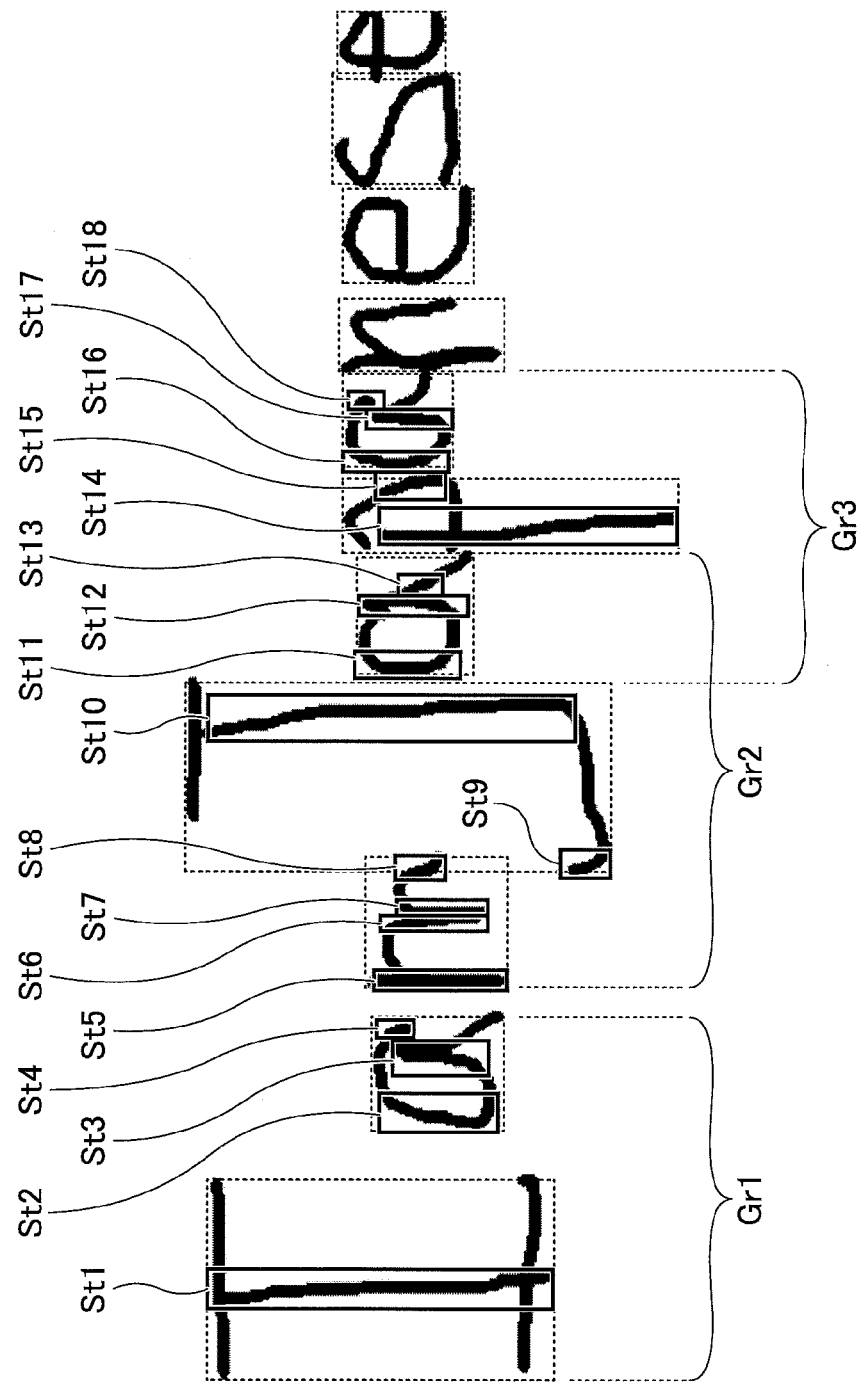
FIG. 12 is a drawing illustrating a method of extracting vertical stroke elements.

FIG. 12 is another drawing illustrating a method of extracting vertical stroke elements. FIG. 12 illustrates vertical stroke elements extracted from characters in groups Gr1, Gr2, and Gr3.

In the group Gr1, vertical stroke elements of the characters "I" and "a" are extracted. A vertical stroke element St1 is extracted from the character "I", and vertical stroke elements St2, St3, and St4 are extracted from the character "a".

In the group Gr2, vertical stroke elements of the characters "m", "J", and "a" are extracted. Vertical stroke elements St5, St6, St7, and St8 are extracted from the character "m", vertical stroke elements St9 and St10 are extracted from the character "J", and vertical stroke elements St11, St12, and St13 are extracted from the character "a".

In the group Gr3, vertical stroke elements of the characters "a", "p", and "a" are extracted. Vertical stroke elements St11, St12, and St13 are extracted from the character "a", vertical stroke elements St14 and St15 are extracted from the character "p", and vertical stroke elements St16, St17, and St18 are extracted from the character "a".

Next, a case where an unnecessary vertical stroke element exists in extracted vertical stroke elements and a case where no vertical stroke element exists in a character are described with reference to FIGS. 13A and 13B.

FIG. 13A illustrates a case where an unnecessary vertical stroke element exists in extracted vertical stroke elements.

In the present embodiment, when multiple vertical stroke elements are extracted from one character, a vertical stroke element(s) whose area is less than areas of other vertical stroke elements by a predetermined value or more is determined as invalid and removed.

FIG. 13A illustrates the vertical stroke elements St9 and St10 extracted from the character "J". The unnecessary element remover 255 compares the areas of the vertical stroke elements St9 and St10 (which are represented by rectangles in FIG. 13A), and determines whether the difference between them is greater than or equal a predetermined value. That is, the unnecessary element remover 255 determines whether the area of the vertical stroke element St9 is less than the area of the vertical stroke element St10 by the predetermined value or more.

In this example, the area of the vertical stroke element St9 is less than the area of the vertical stroke element St10 by the predetermined value or more, and the vertical stroke element St9 is determined as invalid. A vertical stroke element determined as invalid is not used as a reference position in determining the presence of a space.

In the present embodiment, as described above, the unnecessary element remover 255 determines whether a vertical stroke element is invalid based on a difference between the areas of the vertical stroke element and another vertical stroke element(s). However, whether a vertical stroke element is invalid may be determined by any other appropriate method. For example, the positions of vertical stroke elements in each character may be stored in a storage in association with probabilities that the vertical stroke elements are used to determine the presence of a space, and the unnecessary element remover 255 may determine that a vertical stroke element is invalid when the probability corresponding to the position of the vertical stroke element is less than or equal to a predetermined threshold.

FIG. 13B illustrates a case where no vertical element exists in a character.

In the present embodiment, when no vertical stroke element exists in a character, the center of the width of the character recognition frame of the character is used as a reference position in determining the presence of a space.

FIG. 13B illustrates the character "y" that includes no vertical element. In this case, the vertical stroke extractor 254 sets an axis St20 passing through an x coordinate corresponding to the center of a width Wy of a character recognition frame y1 of the character "y" as a vertical stroke element used as a reference position.

Next, exemplary methods of calculating distances between vertical stroke elements are described with reference to FIGS. 14A and 14B.

Figure 14A:
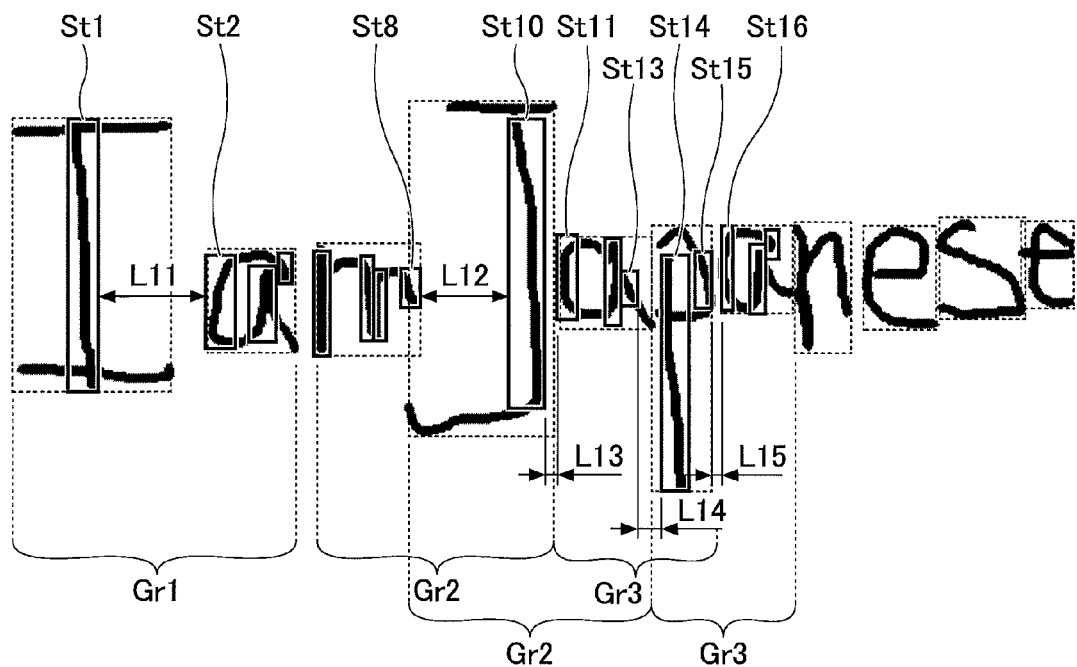
FIGS. 14A and 14B are drawings used to describe methods of calculating distances between vertical stroke elements.

FIG. 14A is used to describe a case where distances between vertical stroke elements in a character string "I am Japanese" are calculated.

The reference-position distance calculator 257 calculates a distance between the rightmost vertical stroke element in a left character and the leftmost vertical stroke element in a right character. In other words, the reference-position distance calculator 257 calculates a distance between a vertical stroke element used as the reference position of a first character and a vertical stroke element that is in a second character adjacent to the first character and closest to the reference position of the first character.

Also in the present embodiment, in calculating a distance between vertical stroke elements, the reference-position distance calculator 257 uses the coordinate(s) of the center of the width of each vertical stroke element as the position of the vertical stroke element.

In the example of FIG. 14A, every one of specific characters in the character string includes one or more vertical stroke elements.

In the group Gr1, a vertical stroke element St1 is extracted from the character "I". Because only the vertical stroke element St1 is extracted from the character "I", the position of the vertical stroke element St1 is used as the reference position of the character "I". More specifically, the coordinate of the center of the width of the vertical stroke element St1 is used as a value indicating the position of the vertical stroke element St1, i.e., as a reference position used to determine the presence of a space between the character "I" and the character "a".

Vertical stroke elements St2, St3, and St4 are extracted from the character "a". In this case, the vertical stroke element St2 closest to the character "I" is used to determine the presence of a space between the characters "I" and "a".

The reference-position distance calculator 257 calculates a distance L11 between the vertical stroke element St1 and the vertical stroke element St2 based on the coordinate of the center of the width of the vertical stroke element St1 and the coordinate of the center of the width of the vertical stroke element St2.

Then, the gap determiner 253 determines that a space is present between the characters "I" and "a" when the distance L11 is greater than or equal to the average inter-character gap $\alpha$ and greater than or equal to the average character width $\beta$.

In the group Gr2, a vertical stroke element St10 is extracted from the character "J". Because only the vertical stroke element St10 is extracted from the character "J", the position of the vertical stroke element St10 is used as the reference position of the character "J". More specifically, the coordinate(s) of the center of the width of the vertical stroke element St10 is used as a value indicating the position of the vertical stroke element St1, i.e., as a reference position used to determine the presence of a space between the character "J" and an adjacent character.

Vertical stroke elements including a vertical stroke element St8 are extracted from the character "m" preceding the character "J". In this case, the vertical stroke element St8 closest to the character "J" is used to determine the presence of a space between the characters "m" and "J".

The reference-position distance calculator 257 calculates a distance L12 between the vertical stroke element St8 and the vertical stroke element St10 based on the coordinate of the center of the width of the vertical stroke element St8 and the coordinate of the center of the width of the vertical stroke element St10.

Also in group Gr2, vertical stroke elements including a vertical stroke element St11 are extracted from the character "a" following the character "J". In this case, the vertical stroke element St11 closest to the character "J" is used to determine the presence of a space between the characters "J" and "a".

The reference-position distance calculator 257 calculates a distance L13 between the vertical stroke element St10 and the vertical stroke element St11 based on the coordinate of the center of the width of the vertical stroke element St10 and the coordinate of the center of the width of the vertical stroke element St11.

Then, the gap determiner 253 determines that a space is present between the characters "m" and "J" when the distance L12 is greater than or equal to the average inter-character gap $\alpha$ and greater than or equal to the average character width $\beta$. Also, the gap determiner 253 determines that a space is present between the characters "J" and "a" when the distance L13 is greater than or equal to the average inter-character gap $\alpha$ and greater than or equal to the average character width $\beta$.

Similarly to the groups Gr1 and Gr2, distances between vertical stroke elements are also calculated in the group Gr3. In the group Gr3, the reference-position distance calculator 253 calculates a distance L14 between a vertical stroke element St13 extracted from the character "a" preceding the character "p" and a vertical stroke element St14 extracted from the character "p" based on the coordinate of the center of the width of the vertical stroke element St13 and the coordinate of the center of the width of the vertical stroke element St14. Also in the group Gr3, the reference-position distance calculator 253 calculates a distance L15 between a vertical stroke element St15 extracted from the character "p" and a vertical stroke element St16 extracted from the character "a" following the character "p" based on the coordinate of the center of the width of the vertical stroke element St15 and the coordinate of the center of the width of the vertical stroke element St16.

Then, the gap determiner 253 determines that a space is present between the characters "a" and "p" when the distance L14 is greater than or equal to the average inter-character gap $\alpha$ and greater than or equal to the average character width $\beta$. Also, the gap determiner 253 determines that a space is present between the characters "p" and "a" when the distance L15 is greater than or equal to the average inter-character gap $\alpha$ and greater than or equal to the average character width $\beta$.

In the example of FIG. 14A, the gap determiner 253 determines that a space is present between the characters "I" and "a" and between the character "m" and "J".

Figure 14B:
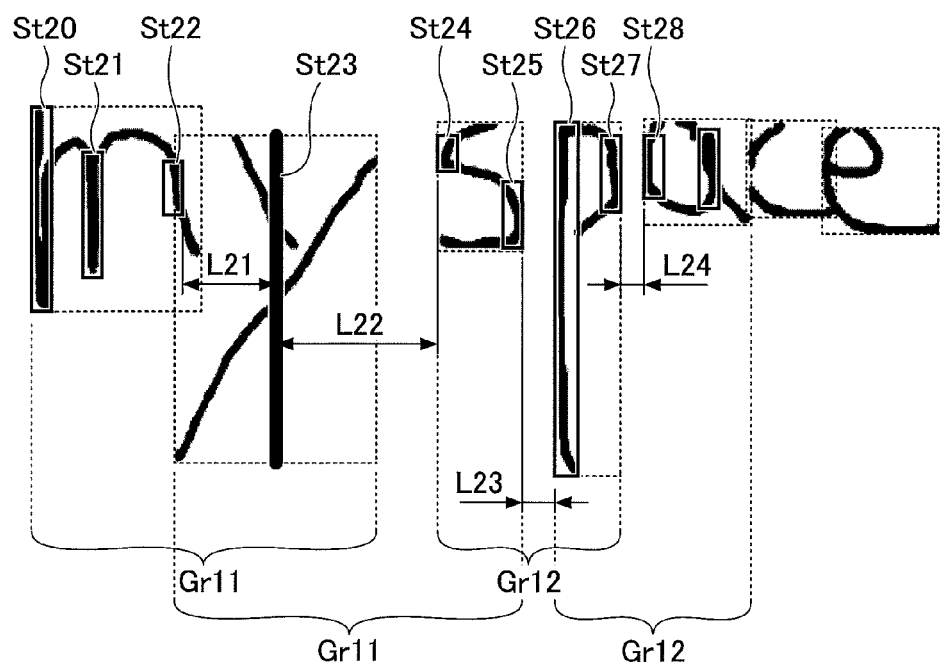

FIG. 14B illustrates an example where no vertical stroke element exists in a specific character in a character string. In FIG. 14B, it is assumed that a character string "my space" is recognized in handwritten data.

In the character string, a character "y" and a character "p" are specific characters. In this case, the character "y" and characters "m" and "s" before and after the character "y" are formed into a group Gr11, and the character "p" and characters "s" and "a" before and after the character "p" are formed into a group Gr12.

In the group Gr11, vertical stroke elements St20, St21, and St22 are extracted from the character "m". In this case, the coordinate of the center of the width of the vertical stroke element St22 closest to the character "y" is used as a reference position to determine the presence of a space between the characters "m" and "y".

Also, an axis St23 passing through the center of the width of the character recognition frame of the character "y" is extracted as a vertical stroke element of the character "y". For the character "y", the center of the width of the character recognition frame is used as a reference position to determine the presence of a space between the characters "m" and "y".

The gap determiner 253 determines that a space is present between the characters "m" and "y" when a distance L21 between the vertical stroke element St22 and the axis St23 is greater than or equal to the average inter-character gap $\alpha$ and greater than or equal to the average character width $\beta$.

Also in the group Gr11, vertical stroke elements St24 and St25 are extracted from the character "s". In this case, the coordinate of the center of the width of the vertical stroke element St24 closest to the character "y" is used as a reference position to determine the presence of a space between the characters "y" and "s".

The gap determiner 253 determines that a space is present between the characters "y" and "s" when a distance L22 between the axis St23 and the vertical stroke element St24 is greater than or equal to the average inter-character gap $\alpha$ and greater than or equal to the average character width $\beta$.

Similarly to the group Gr11, distances between vertical stroke elements are also calculated in the group Gr12. In the group Gr12, the reference-position distance calculator 12 calculates a distance L23 between a vertical stroke element St25 extracted from the character "s" and a vertical stroke element St26 extracted from the character "p" based on the coordinate of the center of the width of the vertical stroke element St25 and the coordinate of the center of the width of the vertical stroke element St26. Also in the group Gr12, the reference-position distance calculator 12 calculates a distance L24 between a vertical stroke element St27 extracted from the character "p" and a vertical stroke element St28 extracted from the character "a" based on the coordinate of the center of the width of the vertical stroke element St27 and the coordinate of the center of the width of the vertical stroke element St28.

The gap determiner 253 determines that a space is present between the characters "s" and "p" when the distance L23 is greater than or equal to the average inter-character gap α and greater than or equal to the average character width β. Also, the gap determiner 253 determines that a space is present between the characters "p" and "a" when the distance L24 is greater than or equal to the average inter-character gap α and greater than or equal to the average character width β.

In the example of FIG. 14B, the gap determiner 253 determines that a space is present between the characters "y" and "s".

Figure 15:
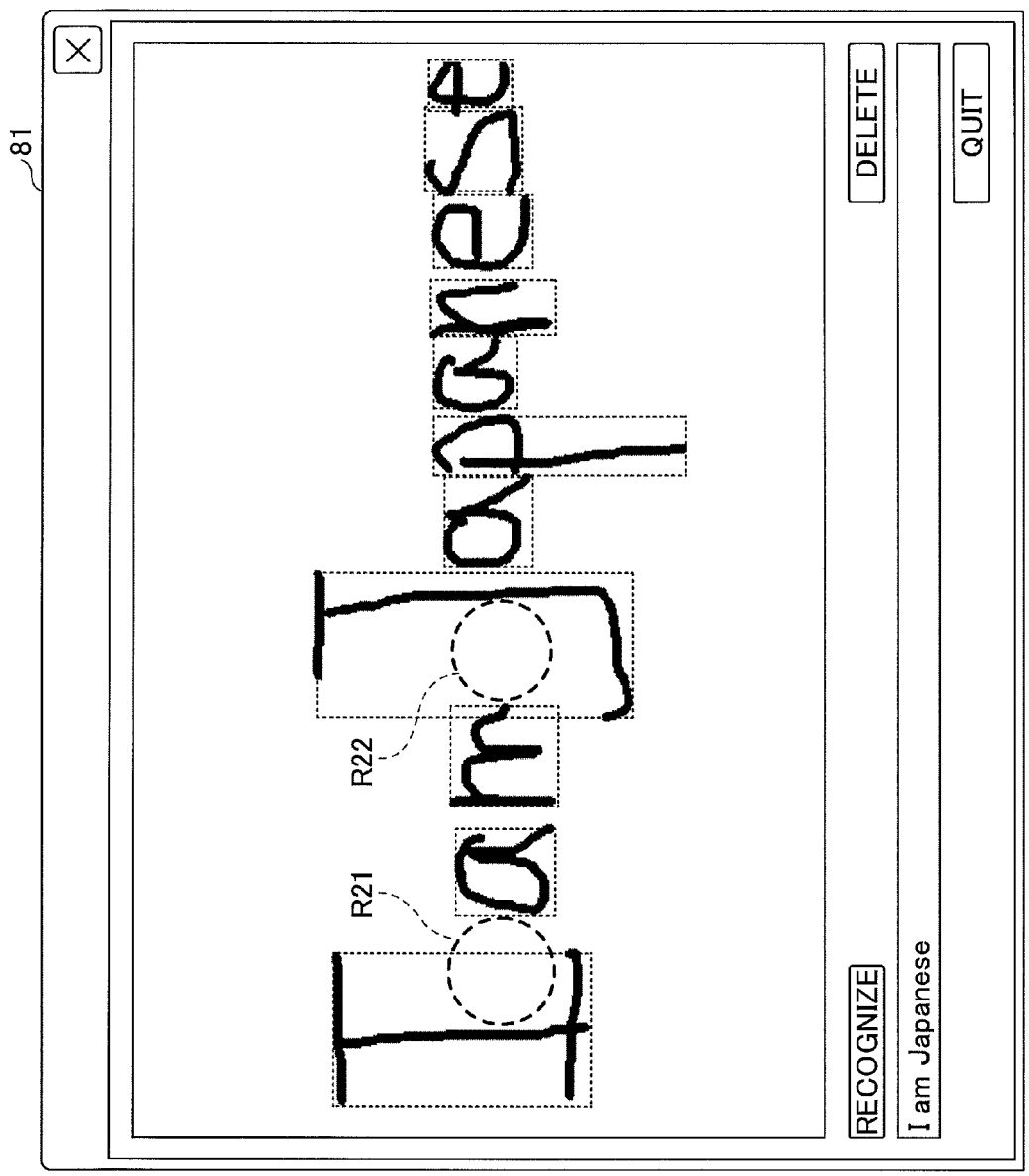
FIG. 15 is a drawing illustrating space insertion positions.

FIG. 15 is a drawing illustrating space insertion positions where spaces are inserted. FIG. 15 illustrates space insertion positions obtained as a result of the process described with reference to FIG. 14A.

In the example of FIG. 15, a space is inserted between the characters "I" and "a" and between the character "m" and "J". In this case, the positional information generator 258 generates information indicating space insertion positions between the first and second characters and between the third and fourth characters in the recognized character string "I am Japanese", and outputs the generated information to the character string determiner 260.

In FIG. 15, an inner area R21 formed by strokes of the characters "I" and "a" exists at the space insertion position between the characters "I" and "a". Also, an inner area R22 formed by strokes of the characters "m" and "J" exists at the space insertion position between the characters "m" and "J".

Thus, in the present embodiment, an inner area formed by strokes of adjacent characters is taken into account in determining the presence of a space between those characters.

Accordingly, the present embodiment makes it possible to improve the accuracy in recognizing spaces between characters even when a recognized character string includes a specific character whose character recognition frame has a boundary that is away from a centroid of the character recognized by a writer.

Second Embodiment

A second embodiment is described below with reference to drawings. The second embodiment is different from the first embodiment in that recognized character strings are verified by referring to a word dictionary database. Accordingly, differences of the second embodiment from the first embodiment are mainly described below. Also, the same reference numbers as those in the first embodiment are assigned to the same or similar components, and descriptions of those components are omitted.

Figure 16:
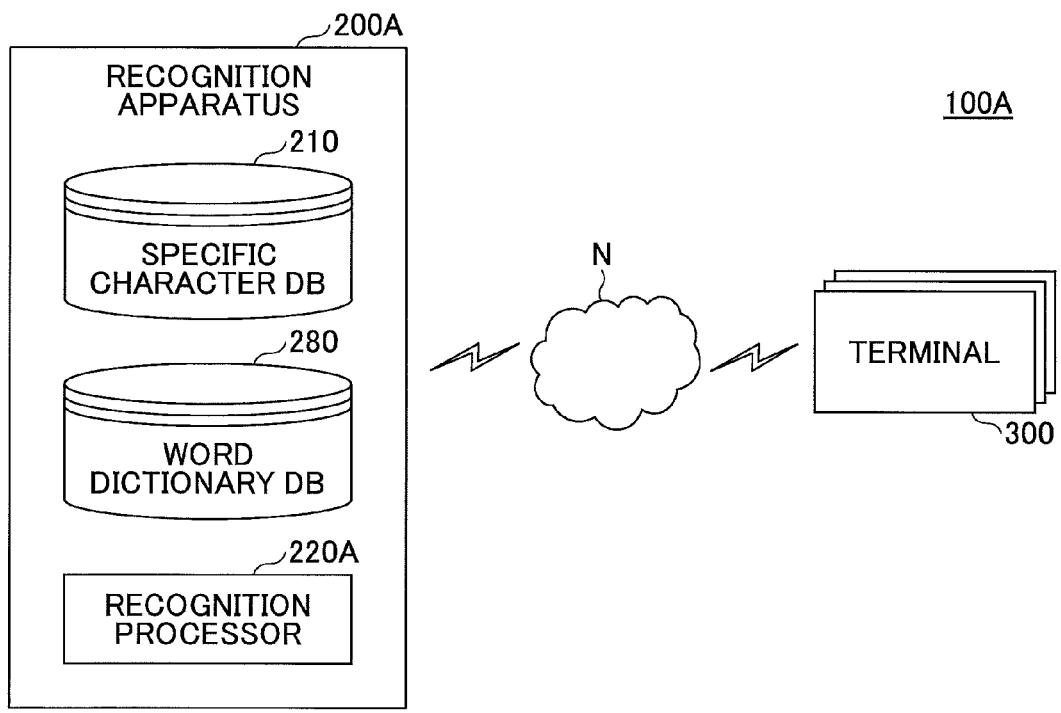
FIG. 16 is a drawing illustrating an exemplary configuration of a recognition system according to a second embodiment.

FIG. 16 is a drawing illustrating an exemplary configuration of a recognition system 100A according to the second embodiment. The recognition system 100A may include a recognition apparatus 200A and a terminal(s) 300.

The recognition apparatus 200A may include a specific character database 210, a recognition processor 220A, and a word dictionary database 280.

The word dictionary database 280 stores words, and may be installed in advance in the recognition apparatus 200A. Although the word dictionary database 280 is provided in the recognition apparatus 200A in the present embodiment, the word dictionary database 280 may be provided in any other apparatus on a network N. In this case, the recognition apparatus 200A refers to the word dictionary database 280 via the network N.

Figure 17:
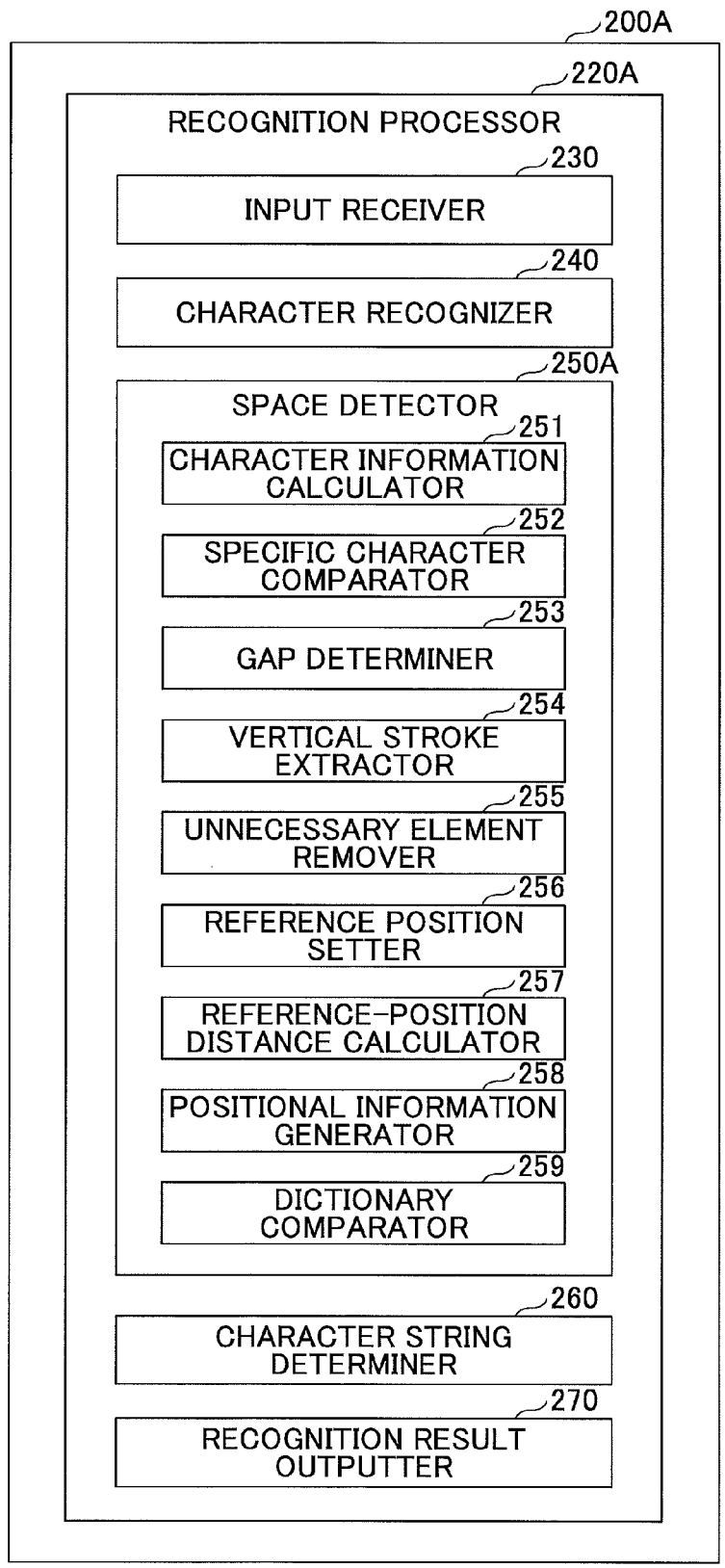
FIG. 17 is a drawing illustrating an exemplary functional configuration of a recognition apparatus of the second embodiment.

FIG. 17 is a drawing illustrating an exemplary functional configuration of the recognition apparatus 200A of the second embodiment. The recognition processor 220A of the recognition apparatus 200A may include an input receiver 230, a character recognizer 240, a space detector 250A, a character string determiner 260, and a recognition result outputter 270.

The space detector 250A of the second embodiment includes a dictionary comparator 259 in addition to the components of the space detector 250 of the first embodiment.

The dictionary comparator 259 compares a character string identified between spaces with words in the word dictionary database 280.

An exemplary space detection process performed by the space detector 250A of the second embodiment is described below with reference to FIG. 18.

Figure 18:
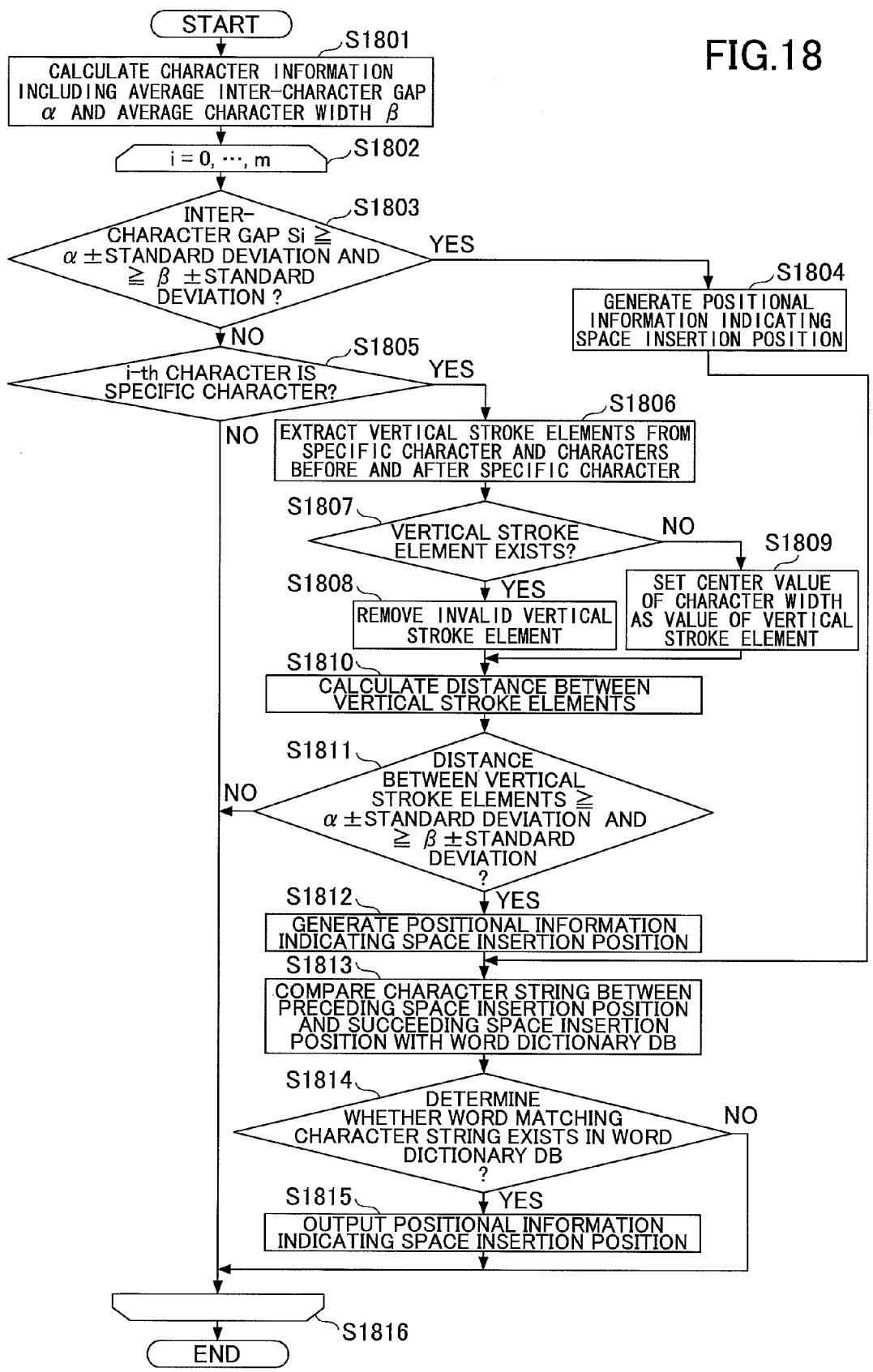
FIG. 18 is a flowchart illustrating an exemplary space detection process of the second embodiment.

FIG. 18 is a flowchart illustrating an exemplary space detection process performed by the space detector 250A of the second embodiment.

Steps S1801 through S1812 of FIG. 18 are substantially the same as steps S701 through S712 of FIG. 7 except that generated positional information is not output to the character string determiner 260 at steps S1804 and S1812, and therefore descriptions of those steps are omitted here.

Following step S1804 or step S1812, the dictionary comparator 259 of the space detector 250A compares a character string between a preceding space insertion position and a succeeding space insertion position with words in the word dictionary database 280 (step S1813). Next, the dictionary comparator 259 determines whether a word matching the character string exists in the word dictionary database 280 (step S1814).

When it is determined at step S1814 that a matching word exists, the dictionary comparator 259 outputs the positional information generated at step S1804 or S1812 to the character string determiner 260 (step S1815). When no word matches at step S1814, the process proceeds to step S1816. Thus, in the present embodiment, when a character string between identified first and second spaces does not exist in the word dictionary database 280, the space detector 250A determines that the first and second spaces (or one of the first and second spaces that succeeds the character string) do not actually exist and does not output positional information indicating insertion positions of the first and second spaces (or one of the first and second spaces) to the character string determiner 260.

Thus, in the present embodiment, the space detector 250A outputs positional information indicating insertion positions of spaces to the character string determiner 260 after determining that a word matching a character string between those spaces exists in the word dictionary database 280.

Thus, the present embodiment makes it possible to improve the accuracy in recognizing words in a character string recognized in handwritten data.

As described above, in the present embodiment, when a character string between identified spaces does not exist in the word dictionary database 280, the space detector 250A determines that those spaces do not actually exist. However, the present invention is not limited to this embodiment. For example, when a character string between identified spaces does not exist in the word dictionary database 280, the space detector 250A may register the character string in the word dictionary database 280 and output positional information indicating space insertion positions to the character string determiner 260. This makes it possible to update the word dictionary database 280 by registering recognized character strings in the word dictionary database 280.

Third and fourth embodiments are described below with reference to FIGS. 19 and 20.

Third Embodiment

Figure 19:
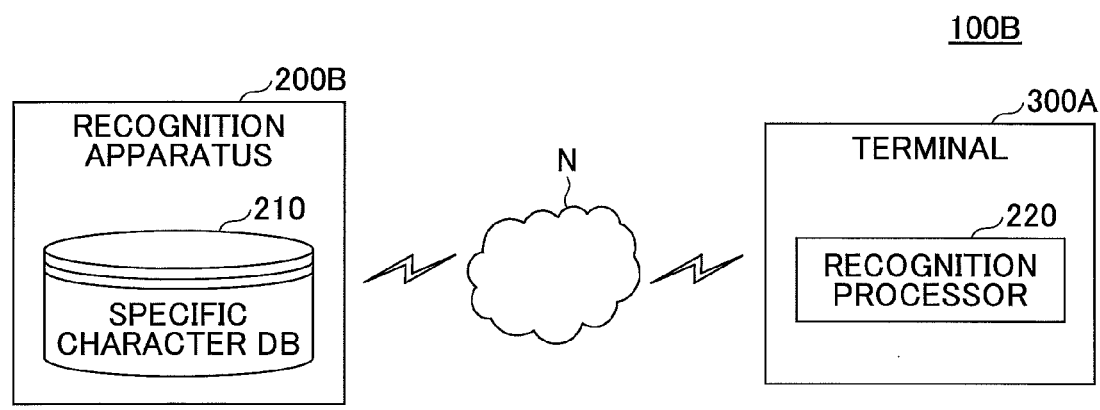
FIG. 19 is a drawing illustrating an exemplary configuration of a recognition system according to a third embodiment.

FIG. 19 is a drawing illustrating an exemplary configuration of a recognition system 100B according to a third embodiment. The recognition system 100B of FIG. 19 includes a recognition apparatus 200B and a terminal 300A.

In the recognition system 100B, the recognition apparatus 200B includes the specific character database 210, and the terminal 300A includes the recognition processor 220.

In this case, the space detector 250 of the recognition processor 220 of the terminal 300A may refer to the specific character database 210 of the recognition apparatus 200B. Also, the recognition apparatus 200B may include the word dictionary database 280.

Fourth Embodiment

Figure 20:
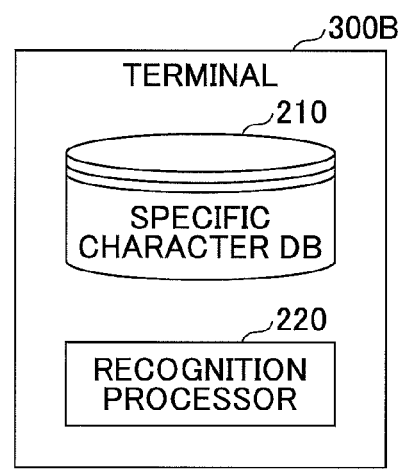
FIG. 20 is a drawing illustrating an exemplary configuration of a terminal according to a fourth embodiment.

FIG. 20 is a drawing illustrating an exemplary configuration of a terminal 300B according to the fourth embodiment. The terminal 300B of FIG. 20 includes the specific character database 210 and the recognition processor 220, and has a function similar to that of the recognition apparatus 200. The terminal 300B may also include the word dictionary database 280.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of superiority or inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein a recognition program that causes a computer to execute a process comprising:
    recognizing a plurality of characters from handwritten characters in input handwritten data;
    setting reference positions of a specific handwritten character and an adjacent handwritten character included in the handwritten characters based on recognition results of the recognized characters, the specific handwritten character and the adjacent handwritten character corresponding to a specific character and an adjacent character included in the recognized characters, respectively, the adjacent character being located adjacent to the specific character;
    determining whether a space is present between the specific character and the adjacent character based on the reference positions; and
    generating space information indicating a result of the determining,
    wherein each of the reference positions is a position of a vertical stroke in or a position of a central axis of a corresponding one of the specific handwritten character and the adjacent handwritten character.

2. The storage medium as claimed in claim 1, the process further comprising:
    determining a character string in the handwritten data based on the recognition results and the space information.

3. The storage medium as claimed in claim 1, the process further comprising:
    comparing a partial character string between a first space and a second space determined to be present with words stored in a dictionary database; and
    determining whether the second space succeeding the partial character string is actually present based on a result of the comparing.

4. The storage medium as claimed in claim 1, the process further comprising:
    obtaining widths of frames surrounding the respective handwritten characters; and
    calculating an average of the widths of the frames and an average of distances between the frames,
    wherein the space is determined to be present between the specific character and the adjacent character when a distance between the reference positions of the specific handwritten character and the adjacent handwritten character is greater than or equal to the average of the widths of the frames and greater than or equal to the average of distances between the frames.

5. The storage medium as claimed in claim 1, wherein when one of the specific handwritten character and the adjacent handwritten character includes no vertical stroke, the position of the central axis of the one of the specific handwritten character and the adjacent handwritten character is set as the reference position of the one of the specific handwritten character and the adjacent handwritten character.

6. The storage medium as claimed in claim 1, wherein when multiple vertical strokes are extracted from each of the specific handwritten character and the adjacent handwritten character, a position of one of the vertical strokes of the specific handwritten character closest to the adjacent handwritten character is set as the reference position of the specific handwritten character, and a position of one of the vertical strokes of the adjacent handwritten character closest to the specific handwritten character is set as the reference position of the adjacent handwritten character.

7. The storage medium as claimed in claim 5, wherein the central axis of the one of the specific handwritten character and the adjacent handwritten character passes through a center of a width of a frame surrounding the one of the specific handwritten character and the adjacent handwritten character.

8. A method performed by a computer, the method comprising:
    recognizing a plurality of characters from handwritten characters in input handwritten data;
    setting reference positions of a specific handwritten character and an adjacent handwritten character included in the handwritten characters based on recognition results of the recognized characters, the specific handwritten character and the adjacent handwritten character corresponding to a specific character and an adjacent character included in the recognized characters, respectively, the adjacent character being located adjacent to the specific character;

determining whether a space is present between the specific character and the adjacent character based on the reference positions; and generating space information indicating a result of the determining, wherein each of the reference positions is a position of a vertical stroke in or a position of a central axis of a corresponding one of the specific handwritten character and the adjacent handwritten character.

9. A recognition apparatus, comprising:

a processor that executes a process including recognizing a plurality of characters from handwritten characters in input handwritten data;

setting reference positions of a specific handwritten character and an adjacent handwritten character included in the handwritten characters based on recognition results of the recognized characters, the specific handwritten character and the adjacent handwritten character corresponding to a specific character and an adjacent character included in the recognized characters, respectively, the adjacent character being located adjacent to the specific character;

determining whether a space is present between the specific character and the adjacent character based on the reference positions; and generating space information indicating a result of the determining, wherein each of the reference positions is a position of a vertical stroke in or a position of a central axis of a corresponding one of the specific handwritten character and the adjacent handwritten character.

* * * * *